Jan. 9, 1934.  L. A. MAYLE  1,943,133
DIE PLACING AND SHIFTING
Filed Sept. 11, 1933   2 Sheets-Sheet 2
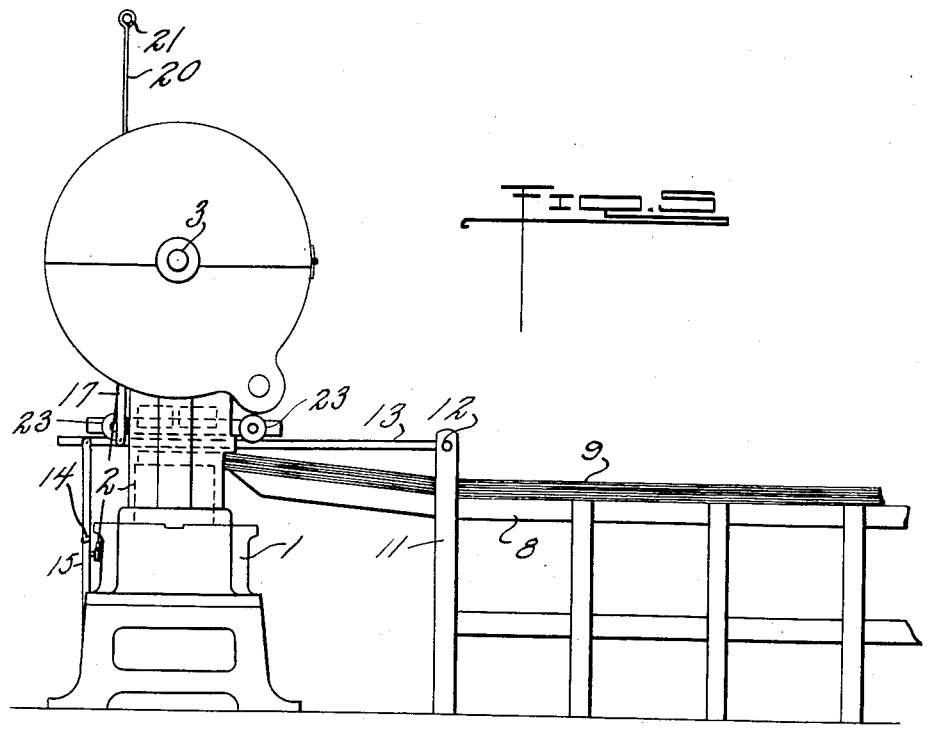
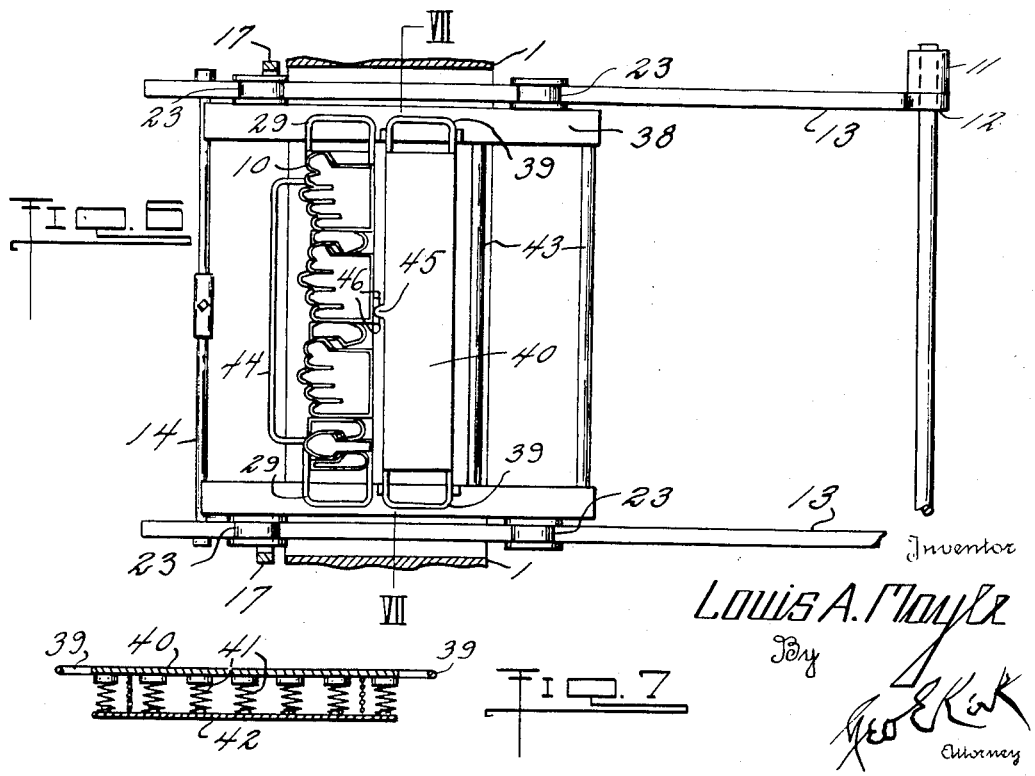
Inventor
Louis A. Mayle
By
Attorney Patented Jan. 9, 1934

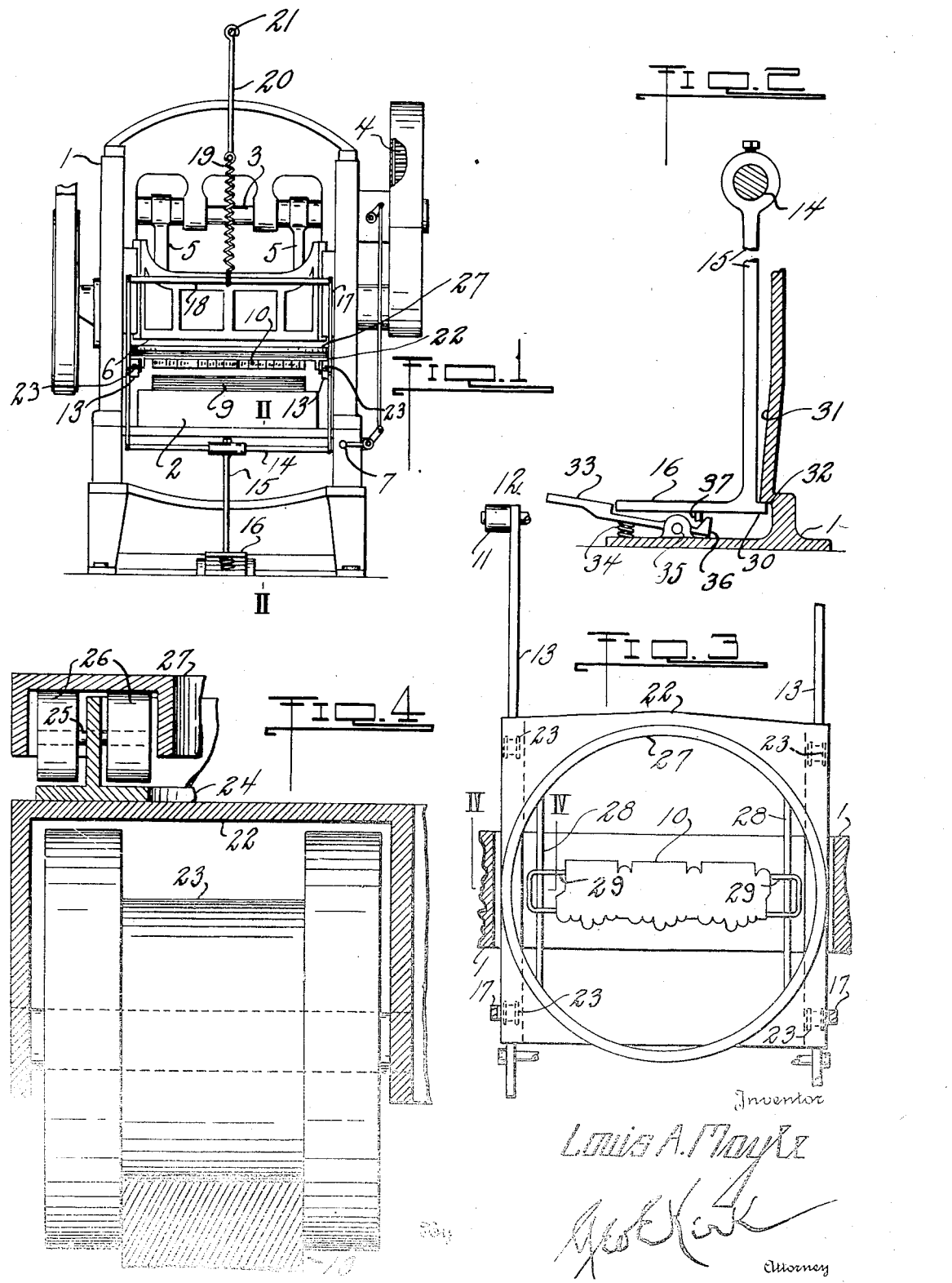

1,943,133

UNITED STATES PATENT OFFICE 1,943,133

DIE PLACING AND SHIFTING

Louis A. Mayle, Fremont, Ohio

Application September 11, 1933
Serial No. 688,981

10 Claims. (Cl. 164—24)

This invention relates to cutting sheet material into blanks.

This invention has utility in a multiple die manipulation and disposition on plural layers at a press, especially upon the compacted layers of the fabric.

Referring to the drawings:

Fig. 1 is a front view of a press having an embodiment of the invention incorporated therewith;

Fig. 2 is a section on the line II—II, Fig. 1;

Fig. 3 is a plan view of the carrier of Fig. 1;

Fig. 4 is a section on the line IV—IV, Fig. 3;

Fig. 5 is a side view, parts being broken away, of the device of Fig. 1 showing a flattening die on the carrier instead of the turn table and die as shown in Fig. 3;

Fig. 6 is a view similar to Fig. 3 of the carrier of Fig. 5; and

Fig. 7 is a section on the line VII—VII, Fig. 6.

Frame 1 is shown as mounting fixed base member 2 as a wood block. This frame 1 mounts shaft 3 having drive wheel 4 operable for cycle to have links 5 cause member 6, opposing the member 2, to descend toward the member 2 and return to lifted position. Operation of handle 7 effects the operation from the drive wheel 4 for giving 360° rotation to the shaft 3 and accordingly a cycle of operation for the member 6 opposing the member 2.

It is accordingly necessary to shift the handle 7 for effecting each cycle of operation. Supply way 8 sustains the plurality of layers 9 of fabric, say canvas for the production of canvas gloves. The general direction of this way 8 is from the rear of the press toward the member 2, in order that pulling of the layers 9 from the way 8 may be directly upon the member 2, there to be acted upon by die 10. This die 10 has the member 6 force the die 10 through the layers 9 toward the block 2 and thus separate from the plurality of layers 9 blanks say for glove forms, such as palms, backs, fingers, thumbs, fourchettes, gauntlets, etc.

Disposed along the way 8 from the press are uprights 11 having pivot bearings 12 for tracks 13, which extend parallel to the general direction of the way 8 and through the side frames of the press 1. In this extent of the tracks 13, there is connection 14 between said tracks from which depends member 15 having therefrom treadle 16. Adjacent the connection 14 but toward the frame therefrom, is connection 17 from the tracks 13 which extends upwardly to bar 18 forming an inverted U-member, rising from which is tension helical spring 19 connected by link 20 to overhead mounting 21. This spring 19 is of such lifting power as to provide counterpoise in sustaining not only the tracks 13, members 14, 18, and treadle 16 but also carrier 22 on the tracks k3 as well as the die 10. It thus follows that in normal condition, with the treadle 16 released, the spring 19 so serves as such a counterpoise that the die 10 is sustained clear of the layers of fabric 9 and the die with the carrier may thus be shifted as carried by the rollers 23 to ride rearwardly on the tracks 13 away from under the member 6 so that the operator may position the layers as desired on the member 2.

When this positioning has taken place, the operator may pull the carrier 22 forwardly into the desired position on the layers 9 and locate the die 10 under the member 6 so that upon the descent of the member 6, the die 10 is forced through the layers of fabric in pushing the die to the member 2.

It is desirable in this operation that the location of the die 10 be by resting on the layers of fabric 9 before the member 6 descends. To this end, the carrier 22 is herein shown as mounting a secondary inverted T-shaped ring 24 carrying pins 25 for rollers 26 coacting with inverted channel 27 as a ring track. This inverted channel ring track 27 may be angularly shifted as to the primary carrier 22, thereby locating supporting bars 28 so that handles 29 of the die 10 may locate the die with nicety over the layers of fabric, all as sustained by the spring 19. The operator, when bringing about this desired relationship, may then depress the treadle 16 against the action of the spring 19. This depressing of the treadle requires little force, inasmuch as the spring 19 approximates but slightly more than balanced position for sustaining the die 10. However, in this descent, the die 10 is deposited on the layers of fabric 9. This removal of a considerable portion of the load required the application of increased force for further depression of the treadle 16 in lowering the primary and secondary carriers, as well as the tracks away from receiving shifting action from the press operation. This descent, in swinging the parts on the pivots 12 of the brackets 11, may be quickly done and the treadle 16 have portion 30 to ride down cam way 31 to seat 32. (Fig. 2).

After the tripping of the handle 7 for the die operation upon the fabric, the operator may place his foot upon the treadle 16 and depress auxiliary treadle 33 against the action of spring 34. This treadle 33 on fixed fulcrum 35 thus causes cam 36 to act on depending portion 37 on the under side of the treadle 16 drawing the extension 30 from the seat 32. The operator then, with foot on the treadle 16, may allow for gradual ascent of the track 13 and the parts carried thereby as actuated by the spring 19. This brings about a lifting of the die 10 from the member 2. In the event the die has automatic ejection means, the blanked portions are left upon the member 2. In the event there is retention of portions of the cutting fabric in the die, the operator may act to remove such formed blanks. It is then in order to shift the carrier 22 toward the bearings 12 to thereby leave ample clearance between the members 2 and 6 for such placing of the layers 9 as may be desired, as well as for removal of the formed blanks. With the completion of these details the carrier 22 may be drawn forward as sustained by the rollers 23 riding on the tracks 13 and the die 10 relocated.

In this combination carrying the ring 27, there is convenience for 180° shifting of the die 10 in the event economy in cutting may be so attained, and this without strain upon the operator and without having the die and its parts interfere with the convenient access of the operator to the press. This swivel or axis mounting for the die may also permit closeness of aligning of this die group 9 transversely of the stock as to its angular direction thereacross.

Transverse shifting may take place by shifting the handles 29 on the supports 28. As their location is obtained by depositing the die 10 on the layers 9 and the treadle 16 coacts as to its portions 30, 32, there may be operation of the handle 7 for a repetition of the pressing operation in another cycle hereunder.

The carrier 22 is shown as extending over the layers 9 and at the depression of the treadle 16 to relieve the spring 19 of the die 10, this carrier may ride on the layers 9 and have to some degree action to smooth the multiple layers of the cloth so that such will be compacted or flattened with less air between.

A more effective flattening may occur in mounting on sustaining rods 28 or sustaining frame 38, handles 39 of flattener 40. This flattener 40 has from its upper extension portion, helical compression springs 41 to plate 42. The over-all distance between the plates 42 approximates the height of the die 10. Spring ejectors in the die approximate the common pressing action upon the stock which the stock undergoes in the die. This flattener is thus effective in that the delivery or terminal portion of the layers 9 at the press are a relatively hard compact mass with definite marginal portions. This means that the die may be located with accuracy for minimum clearance at the margins with little hazard for working off the stock surface. This is a feature of added economy hereunder. This sustaining frame 38 is open at the forward end while at the rearward end are parallel frame members 43 connecting this into a unit mounted by rollers 23 on the tracks 13.

The die 10 is provided with additional handle 44 besides the sustaining handles 29. These handles, located away from the top edge of the die, are safeguards for the operator in locating the die against hazard of being pinched should there be untimely tripping of the press handle 7. This manipulation of the handles 44 may be as to projection 45 on the flattener as a fulcrum with cooperating lugs 46 allowing for such transverse clearance as to take care of a small range of transverse shifting of the die. The angular shifting of this die 10 may accordingly be independent of the angular shifting of the flattener 40.

It is thus seen from the disclosure herein that there may be ready location of a multiple die of considerable weight. This locating is without physical strain upon the operator and may thus be a handling which the operator may carry on for rapid operations without fatigue, and with efficiency in the handling of the press. In the operations wherein say as many as forty-eight layers of fabric are carried, the accuracy of die setting is a matter which may show great economy.

What is claimed and it is desired to secure by Letters Patent is:

1. The combination with a press having a pair of opposing members and directing means for layers of fabric to be received between the members, of a track extending into the press adjacent the members, a carrier movable along said track into position adjacent the members, a die mounted directly on the carrier, sustaining means for the carrier locating the die clear of the layers of fabric at the members, and control means operable to bring the die to repose on the layers of fabric.

2. The combination with a press having a pair of opposing members and directing means for layers of fabric to be received between the members, of a track providing a way from the direction of the layers into the press, a carrier movable along said way into and out of the press, a die movably and directly mounted on the carrier, sustaining means for the carrier locating the die clear of the layers of fabric of the press, and control means connected to the carrier and operable to bring the die to repose on the layers of fabric.

3. The combination with a press having a pair of opposing members and directing means for layers of fabric to be received between the members, of a track providing a way from the direction of the layers into the press, a carrier movable along said way into and out of the press, a die mounted on the carrier, yieldable counterpoise means for the carrier locating the die clear of the layers of fabric at the press, and control means for depositing the die on the layers of fabric clear of said carrier and way.

4. The combination with a press having a pair of opposing members and directing means for layers of fabric to be received between the members, of a track providing a way from the direction of the layers into the press, a carrier movable along said way into and out of the press, a die mounted on the carrier for shifting with and relatively to the carrier for locating on the layers of fabric, yieldable counterpoise means for the carrier locating the die clear of the layers of fabric at the press, control means for depositing the die on the layers of fabric clear of said carrier and way for operation on the press, and releasable means coacting with the control means to hold the carrier and way clear of sustaining the die during said press operation.

5. The combination with a press having a pair of opposing members and directing means for layers of fabric to be received between the members, of a track providing a way from the direction of the layers into the press, a carrier movable along said way into and out of the press, a flattener movably mounted on the carrier, sustaining means for the carrier locating the flattener clear of the layers of fabric of the press, and control means connected to the carrier and operable to bring the flattener to repose on the layers of fabric.

6. The combination with a press having a pair of opposing members and directing means for layers of fabric to be received between the members, of a track providing a way from the direction of the layers into the press, a carrier movable along said way into and out of the press, a die and flattener movably mounted on the carrier, sustaining means for the carrier locating the die and flattener clear of the layers of fabric of the press, and control means connected to the carrier and operable to bring the die and flattener to repose on the layers of fabric.

7. The combination with a press having a pair of opposing members and directing means for layers of fabric to be received between the members, of a track providing a way from the direction of the layers into the press, a carrier movable along said way into and out of the press, a die, coacting means on the carrier providing a relatively movable positioning for the die on the carrier, sustaining means for the carrier locating the die clear of the layers of fabric of the press, and control means connected to the carrier and operable to bring the die to repose on the layers of fabric.

8. The combination with a press having a pair of opposing members and directing means for layers of fabric to be received between the members, of a track providing a way from the direction of the layers into the press, a primary carrier movable along said way into and out of the press, an angularly shiftable secondary carrier on the primary carrier, a die mounted on the secondary carrier, yieldable counterpoise means for the carriers locating the die clear of the layers of fabric at the press, and control means for depositing the die on the layers of fabric clear of said carriers and way.

9. The combination with a press having a pair of opposing members and directing means for layers of fabric to be received between the members, of a track providing a way from the direction of the layers into the press, a primary carrier movable along said way into and out of the press, an angularly shiftable secondary carrier on the primary carrier, said secondary carrier having ring track bearing mounting on the primary carrier, a die mounted on the secondary carrier, yieldable counterpoise means for the carriers locating the die clear of the layers of fabric at the press, and control means for depositing the die on the layers of fabric clear of said carriers and way.

10. The combination with a press having a pair of opposing members and directing means for layers of fabric to be received between the members, of a track providing a way from the direction of the layers into the press, a primary carrier movable along said way into and out of the press, an angularly shiftable secondary carrier on the primary carrier, a die mounted on the secondary carrier and transversely shiftable relatively to said track, yieldable counterpoise means for the carrier locating the die clear of the layers of fabric at the press, and control means for depositing the die on the layers of fabric clear of said carriers and way.

LOUIS A. MAYLE.